US012667851B2

(12) United States Patent
Farley

(10) Patent No.: US 12,667,851 B2
(45) Date of Patent: Jun. 30, 2026

(54) FILTERED SHOWER ARM BRACKET WITH PIVOTING SHOWER ARM SUPPORT

(71) Applicant: David Farley, Corona, CA (US)

(72) Inventor: David Farley, Corona, CA (US)

( * ) Notice: Subject to any disclaimer, the term of this patent is extended or adjusted under 35 U.S.C. 154(b) by 43 days.

(21) Appl. No.: 18/671,740

(22) Filed: May 22, 2024

(65) Prior Publication Data

US 2025/0360521 A1 Nov. 27, 2025

(51) Int. Cl.
B05B 1/18 (2006.01)
C02F 1/00 (2023.01)

(52) U.S. Cl.
CPC ................ B05B 1/18 (2013.01); C02F 1/003 (2013.01); C02F 2201/006 (2013.01); C02F 2307/06 (2013.01)

(58) Field of Classification Search
CPC ...... B05B 1/18; C02F 1/003; C02F 2201/006; C02F 2307/06
USPC ............................................................. 4/615
See application file for complete search history.

(56) References Cited

U.S. PATENT DOCUMENTS

| | | | | |
|---|---|---|---|---|
| 5,545,314 A | * | 8/1996 | Parise | ................... E03C 1/0409 |
| | | | | 4/615 |
| 8,268,168 B2 | * | 9/2012 | Mang | ...................... C02F 1/003 |
| | | | | 210/236 |
| 2008/0169362 A1 | * | 7/2008 | Kwan | .................... E03C 1/066 |
| | | | | 239/442 |
| 2023/0347372 A1 | * | 11/2023 | Yu | ........................... B05B 15/40 |
| 2023/0382764 A1 | * | 11/2023 | Guo | ......................... C02F 1/003 |

* cited by examiner

*Primary Examiner* — Huyen D Le
(74) *Attorney, Agent, or Firm* — Stetina Garred Brucker & Newboles

(57) ABSTRACT

A showerhead having integrated filtration capabilities and configured for use with a handheld sprayer includes a housing having an inlet fluidly connectable to a fluid source. An outlet is in fluid communication with the inlet and configured to be fluidly connectable to the hose. A filter cartridge is selectively positionable within the housing between the inlet and the outlet, with the filter cartridge being configured to remove impurities from liquid passing therethrough. A holder is pivotally coupled to the housing and is configured to detachably engage with the handheld sprayer.

20 Claims, 3 Drawing Sheets

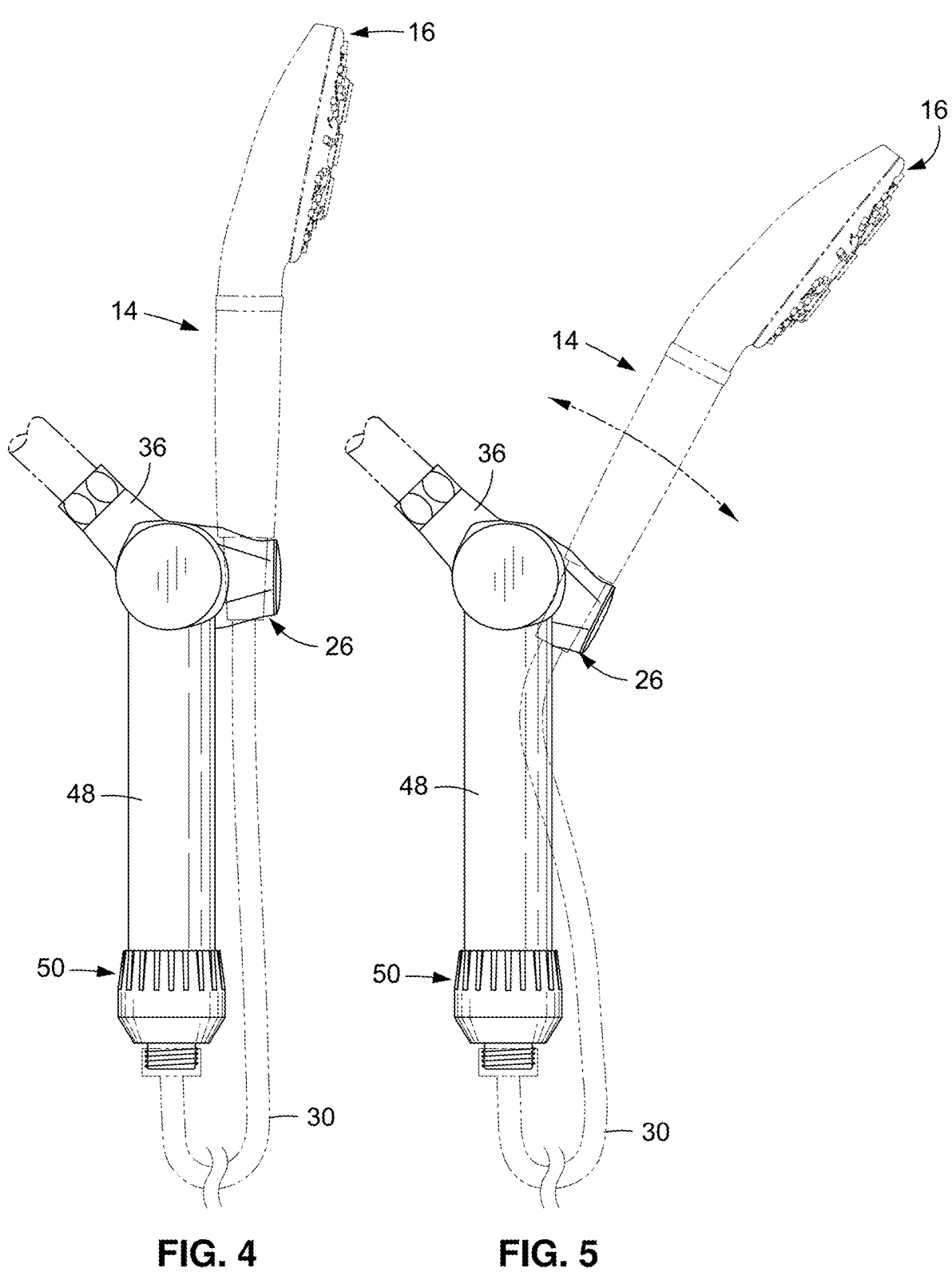
FIG. 4          FIG. 5

FILTERED SHOWER ARM BRACKET WITH PIVOTING SHOWER ARM SUPPORT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a showerhead, and more particularly, to a showerhead having an integrated filter cartridge and a handheld sprayer that is pivotally supportable on a main housing.

2. Description of the Related Art

Conventional showerheads typically include a sprayer mounted in a generally fixed position on the end of a water line elevated above a shower or tub. This arrangement may allow pressurized water to be directed in a downward direction toward a user to facilitate washing and rinsing of dirt and soap from the user's body. The elevated, generally fixed, position of the sprayer has proven to be useful for many individuals. However, there are some limitations to a fixed sprayer.

One limitation commonly associated with a fixed sprayer is that targeted spraying to certain areas of the user's body may be difficult, particularly lower areas of the user's body. Furthermore, tall individuals may be challenged by the fixed location of the sprayer, as their head may extend above the sprayer, which may require bending of their head to place it within the stream of water. Another drawback is that a fixed sprayer may be challenging for children, as they may be too short to be effectively rinsed by the water pattern created by the fixed sprayer. The water pattern may be too wide by the time it reaches the height of the child, and thus, a large portion of the water may not fall on the child. Fixed sprayers may also be challenging for the elderly or the disabled, who may need to shower in a wheelchair.

In view of these drawbacks, handheld sprayers have been developed, which include a sprayer head attached to a hose extending from a base or hub. The length of the hose provides a range of motion of the sprayer head to address some of the aforementioned deficiencies of fixed sprayers. For instance, the handheld sprayer may be grabbed by a user and moved into close proximity to the area on the user's body in need of rinsing. When the user wants to use both hands, the handheld sprayer may be returned to its base or support, which typically extends from the forward wall of the shower. However, when conventional handheld sprayers are placed on their base, there is oftentimes a limited amount of adjustment that can be made to the angle of the water dispensed from the handheld sprayer.

In addition to different types of shower sprayers (e.g., fixed and handheld), another feature commonly incorporated into showerheads is a water filter. Many shower filters are formed as cylindrical bodies having cylindrical filter cartridges formed therein. Such shower filters are typically connected at one end to a shower arm and at the other end to a showerhead. While such shower filters are effective in filtering impurities in the shower water, they may suffer from certain limitations. For example, the use of an in-line shower filter in combination with the separate showerhead tends to move the position of the showerhead further into the shower stall to a position that may be less desirable. Additionally, in order to replace the filter cartridge in such an assembly, it may become necessary to disconnect the shower filter body from the shower arm and/or the shower filter, to allow the filter body to be opened in the cartridge to be removed and replaced.

More recently, the functionality of the shower filter in a showerhead has been combined in a single filtered showerhead, where the body of the showerhead may be sized and configured to contain a filter cartridge. Such filtered showerheads provide advantages, such as limiting the extension of the showerhead into the shower. However, such combined filtered showerhead is associated with certain limitations. For example, the filter cartridge may need to be customized in shape to be accommodated within the body, and typically require the filtered showerhead to be disassembled, and/or disconnected from the shower arm before the filter cartridge may be replaced. As such cartridges may be of a more customized shape, they may be more expensive, and more difficult to locate when they need to be replaced.

In view of foregoing, it is desirable to have a showerhead that addresses all of the deficiencies noted above. In particular, there is a desire for a showerhead that incorporates the functionality of a handheld sprayer, while also incorporating easy-to-use water filtration capabilities. With an inline filter being installed before it, thus eliminating the need to install a filter inside the showerhead handle, such handle avoids diameter increases as could otherwise make it larger, unbalanced and difficult for children or those with smaller hands to grip and/or hold on to. Also, as this is a universal device, it will accept any handheld shower head, and in so doing allows the user to convert their preferred shower handle to a filtered device with rotational capabilities. Various aspects of the present disclosure address this particular need, as will be discussed in more detail below.

BRIEF SUMMARY

In accordance with one embodiment of the present disclosure, there is provided a showerhead having integrated filtration capabilities and configured for use with a handheld sprayer coupled to a hose. The showerhead includes a housing having an inlet fluidly connectable to a fluid source. An outlet is in fluid communication with the inlet and configured to be fluidly connectable to the hose. A filter cartridge is selectively positionable within the housing between the inlet and the outlet, with the filter cartridge being configured to remove impurities from liquid passing therethrough. A holder is pivotally coupled to the housing and is configured to detachably engage with the handheld sprayer.

The housing may define a longitudinal axis, with the holder being pivotal relative to the housing about an axis that is perpendicular to the longitudinal axis.

The holder may be pivotable relative to the housing between a first pivot position and a second pivot position. The holder may be configured such that the holder pivots between 35-90 degrees as the holder pivots between the first pivot position and the second pivot position.

The holder may be configured to receive a portion of the handheld sprayer along an engagement axis, with the engagement axis moving within a first plane spaced from the housing when the holder pivots relative to the housing.

The housing may include a main body and a cap configured to be detachably connectable to the main body. The filter cartridge and main body may be configured to facilitate insertion of the filter cartridge into the main body when the cap is detached from the main body. The cap may include a threaded portion configured to engage with the hose.

The inlet may include an inlet fitting extending around an inlet axis and the outlet may include an outlet fitting extending around an outlet axis, with the inlet axis being angularly offset from the outlet axis.

According to another embodiment, there is provided a showerhead configured for use with a filter cartridge. The showerhead includes a housing having an inlet fluidly connectable to a fluid source and an outlet in fluid communication with the inlet. The housing being sized to receive the filter cartridge at least partially therein. The showerhead additionally includes a hose fluidly connectable to the outlet, and a handheld sprayer connected to the hose. A holder is pivotally coupled to the housing and is configured to detachably engage with the handheld sprayer.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is a side view of the showerhead, with the handheld sprayer being at a first pivotal position relative to the main body; and FIG. 5 is a side view of the showerhead, with the handheld spray being pivoted to a second pivotal position relative to the main body, the second pivotal position being different from the first pivotal position.

Common reference numerals are used throughout the drawings and the detailed description to indicate the same elements.

DETAILED DESCRIPTION

The detailed description set forth below in connection with the appended drawings is intended as a description of certain embodiments of a showerhead and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figures 1, 2:
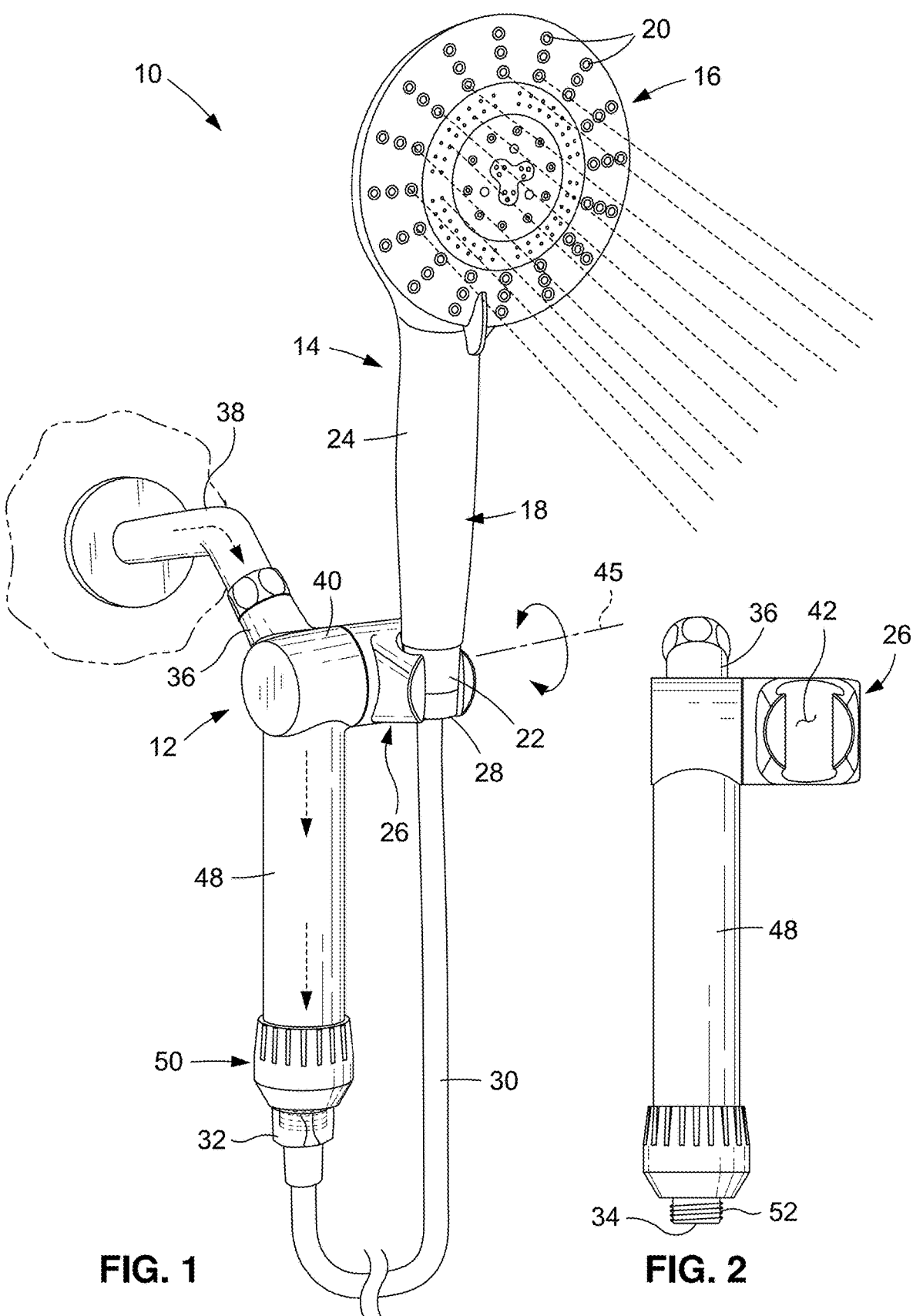
FIG. 1 is an upper perspective view of a showerhead comprising a housing having a pivoting holder, and a handheld sprayer which is releasably engageable to the pivoting holder.
FIG. 2 is a front view of the housing of the showerhead, with the handheld sprayer and hose being removed therefrom.
Figure 3:
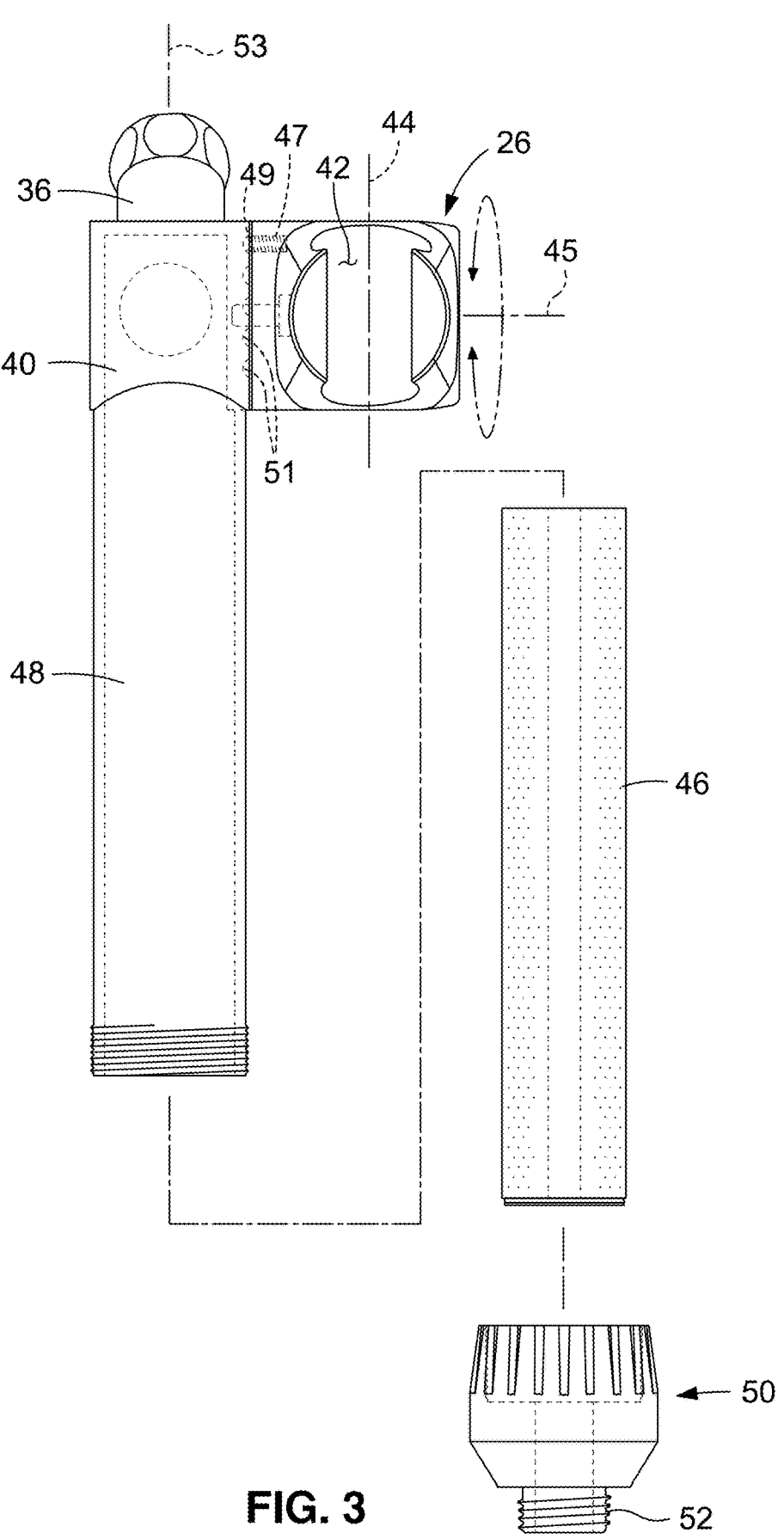
FIG. 3 is an exploded front view of the housing of the showerhead depicted in FIG. 2.

Referring now to FIG. 1, there is depicted a showerhead 10 generally including a housing 12 and a handheld sprayer 14 fluidly connectable to the housing 12 and adapted to be selectively supported by the housing 12. As will be explained in more detail below, the housing 12 and the sprayer 14 may be configured to facilitate pivoting of the sprayer 14 relative to the housing 12 when the sprayer 14 is supported by the housing 12. Such pivotal movement may allow for selective variation in the angle of water dispensed by the sprayer 14 when the sprayer 14 is supported by the housing 12 (e.g., not manually held by the user). The sprayer 14 may also be removed from the housing 12 and manually held by the user to achieve more targeted dispensing of water from the sprayer 14. The showerhead 10 may additionally include an integrated filtration cartridge configured to filter water prior to the water being dispensed through the handheld sprayer 14. Thus, the showerhead 10 enhances the functionality of conventional handheld sprayers by allowing for selective pivotal motion when the sprayer 14 is docked on the housing 12, and also allows for filtration of water dispensed by the sprayer 14.

The handheld sprayer 14 may include a sprayer head 16 connected to a gripping wand 18. The sprayer head 16 may include a plurality of openings 20 formed in a face thereof, with the openings 20 being configured to allow water to flow therethrough. The handheld sprayer 14 may be configured to achieve multiple water patterns based on the position of a movable dial located on the face of the sprayer 14, or via selective actuation of buttons or other pattern controllers on the sprayer 14. The dial may be rotatable relative to an adjacent part of the sprayer head 16 to selectively open and close select openings to achieve the desired spray pattern.

The gripping wand 18 may be elongate in configuration to allow for easy gripping thereof by a user. In this regard, the gripping wand 18 may include a lower end portion 22 and an upper end portion 24. The lower end portion 22 may be tapered to allow for easy receipt within a wand holder 26 on the housing 12, which will be explained in more detail below. In this regard, the lower end portion 22 may include a lower end surface 28 which defines a minimum diameter (or minimum periphery for non-circular configurations), with the lower end portion 22 having an increasing diameter (or periphery) as the lower end portion 22 extends from the lower end surface 28 toward the upper end portion 24 of the gripping wand 18. The lower end portion 22, or a select region thereof may be fabricated from rubber or other grip-enhancing materials known in the art to enhance friction forces between the lower end portion 22 and the wand holder 26 when the handheld sprayer 14 is seated within the wand holder 26 to mitigate undesirable movement of the lower end portion 22 relative to the want holder 26.

The upper end portion 24 of the gripping wand 18 may extend between the lower end portion 22 and the sprayer head 16 and may provide an easily graspable structure for a user to grip. In this regard, the length and width of the upper end portion 24 may be sufficient to allow for a user to grab onto the upper end portion 24 in the palm of the user's hand. The upper end portion 24 and lower end portion 22 may collectively define an internal flow passage to allow for delivery of water the sprayer head 16.

The gripping wand 18 may be connected to a hose 30, which extends between the gripping wand 18 and the housing 12 to facilitate fluid interconnection therebetween. The hose 30 includes an end connector 32 configured to be detachably connectable to an outlet 34 on the housing 12 to achieve fluid connection therebetween. The opposite end of the hose 30 may be more permanently connected to the lower end portion 22 of the gripping wand 18, or alternatively, the hose 30 may be detachably connectable to the lower end portion 22 of the gripping wand 18. Detachable connections at the end(s) of the hose 30 may be facilitated through threaded connections, or other detachable connections known in the art. The hose 30 provides a flexible range of motion of the handheld sprayer 14 relative to the housing 12 during use.

The housing 12 is configured to be connected to a fluid source 38 to receive fluid therefrom and to deliver the fluid to the handheld sprayer 14 via the hose 30. In this regard, the housing 12 includes an inlet 36 configured to be fluidly connectable to the fluid source 38, such as a pressurized residential water line, to receive fluid therefrom. The housing 12 also includes an outlet 24 in communication with the inlet and configured to be fluidly connectable to the handheld sprayer 14 via the hose. The inlet and the outlet may be fluidly connected to each other via an internal flow passage extending within the housing.

The housing 12 may be configured to be interconnected to the fluid source 38 and via threaded connections. The inlet 36 may include a threaded connector extending around an opening leading to an internal fluid passageway on the housing 12. The housing threaded connector may be configured to engage with a corresponding threaded connector associated with the fluid source 38. It is contemplated that the threaded connector may incorporate a ball-in-socket type connection to facilitate a degree of swivel movement of the showerhead 10.

The housing 12 may also include the wand holder 26 rotatably coupled to a portion of the housing 12 (e.g., a main housing body 40). The wand holder 26 may include a central opening 42 sized to receive the lower end portion 22 of the gripping wand 18 to retain the gripping wand 18 in place. In this regard, the central opening 42 may be sized and configured to allow for insertion and removal of the lower end portion 22 of the gripping wand 18 along an engagement axis 44 that passes through the central opening 42, while restricting removal of the gripping wand 18 along axes that are offset from the engagement axis 44. A slot may extend from the central opening 42 toward an outer surface of the wand holder 26 to accommodate the hose 30 when the gripping wand 18 is inserted and removed from the wand holder 26.

The wand holder 26 may be rotatable relative to the main housing body 40 about a rotation axis 45, which may be perpendicular to the engagement axis 44, as well as being perpendicular to a longitudinal axis 53 defined by a portion of the main housing body 40. In one embodiment, the longitudinal axis 53 is defined by an elongate portion 48 of the housing 12 sized to receive a filter cartridge 46, as will be described in more detail below. The rotation of the wand holder 26 about the rotation axis 45 may facilitate angular adjustment of the handheld sprayer 14 when the gripping wand 18 is mounted within the wand holder 26. In one embodiment, the wand holder 26 may swivel approximately 45 degrees between an upright position and a lowered position, with the handheld sprayer 14 being lowered as the wand holder 26 rotates from the upright position toward the lowered position, and the handheld sprayer 14 being raised as the wand holder 26 rotates from the lowered position toward the upright position.

According to one embodiment, the wand holder 26 may be associated with a plurality of predefined rotation positions relative to the main housing body 40. In this regard, the predefined rotation positions may allow the wand holder to support the sprayer 14 in a given angular position relative to the housing 12. In one particular implementation, the wand holder 26 may include an internal spring 47 coupled to a locking ball 49 which may be selectively positioned within corresponding recesses 51 formed in the main housing body 40. When the locking ball 49 is seated within a recess 51, the spring 47 may apply a biasing force on the locking ball 49 to maintain the locking ball 49 within the recess 51, which may effectively lock the wand holder 26 in position relative to the main housing body 40. However, if a user wants to adjust the angular position of the sprayer 14, the user imparts a force on the sprayer 14, when seated within the wand holder 26, which in turn imparts a rotational forced on the wand holder 26, which urges the locking ball 49 out of the recess 51 that the locking ball 49 was seated in. The user may then adjust the pivotal position of the sprayer 14, with the wand holder 26 rotating relative to the main housing body 40, until the locking ball 49 is seated within a recess 51 most closely corresponding to the desired angular position of the sprayer 14. In this regard, the spring 47 and locking ball 49 rotate with the body of the wand holder 26.

Although the foregoing describes a locking mechanism including a spring 47 and locking ball 49, it is contemplated that other locking mechanisms may be used without departing from the spirit and scope of the present disclosure. For instance, the wand holder 26 may be coupled to the main housing body 40 with sufficient force to create friction therebetween which is sufficient to hold the sprayer 14 in a desired angular position, while at the same time allowing a user to overcome the friction force to adjust the angular position of the sprayer 14.

The housing 12 may be configured to receive the filter cartridge 46 therein to remove impurities from the water flowing through the showerhead 10. In one embodiment, the housing 12 may include the elongate portion 48 extending in a longitudinal direction to define the longitudinal axis 53. The elongate portion 48 may be sized to include an internal cavity which receives the filter cartridge 46. A lower end region of the elongate portion 48 may be open to allow for insertion and removal of the filter cartridge 46 therefrom. A cap 50 may be detachably connectable to the elongate portion 48. When the cap 50 is connected to the elongate portion 48, the filter cartridge 46 may be contained within the elongate portion 48. However, when the cap 50 is disconnected from the elongate portion 48, the filter cartridge 46 may be removed and replaced. The cap 50 may include a threaded connector 52 which may be connectable to the end connector 32 of the hose 30 to facilitate fluid communication therebetween. The threaded connector 52 may be the most downstream portion of the housing 12, and thus, may define the outlet 34 of the housing 12.

It is also contemplated that the elongate configuration of the gripping wand 18 may also allow for receipt of a filter cartridge 46. In this regard, the lower end portion 22 of the gripping wand 18 may be detachable from the upper end portion 24 of the gripping wand 18 to access an internal cavity therein, which may be sized to receive a filter cartridge 46. As such, the showerhead 10 may be configured to allow for placement of the filter cartridge 46 in the stationary portion of the showerhead 10 (e.g., the elongate portion 48) or alternatively, in the moveable part of the showerhead 10 (e.g., in the gripping wand 18).

A filter cartridge 46 located in the gripping wand 18 may be in replace of, or in addition to, a filter cartridge 46 in the elongate portion 48. In this respect, when the filter cartridge 46 is located solely in the gripping wand 18, it may be easier to swap out filter cartridges 46 by removing the gripping wand 18 from the wand holder 26 to conduct the cartridgeswapping at a lower location (e.g., a location where the user may not be required to raise his hands). In the case of multiple filter cartridges 46 (e.g., a cartridge 46 in the housing 12 and an additional cartridge 46 in the gripping wand 18), the multiple cartridges 46 may provide redundant filtration capabilities, or alternatively, the multiple cartridges 46 may be configured to filter different impurities.

The filter cartridge 46 may include a portion formed from carbon or other filtration materials known in the art. The filter cartridge 46 may be annular and define an inner diameter and outer diameter. The filter cartridge 46 may include a single element, or multiple elements stacked on top of each other. The filter cartridge 46 may be retained within the housing 12 by the end connector 32 of the hose 30.

For more information regarding the filter cartridge 46 and use thereof, please refer to U.S. Pat. No. 11,192,134, entitled Offset Showerhead Filter, the contents of which are expressly incorporated herein by reference.

During operation of the showerhead 10, the user may turn on the water, which causes water to flow into the housing 12 via the inlet 36. The water passes through filter cartridge 40 and then flows to the sprayer 14, and the water is dispensed from the showerhead 10.

The user may adjust the angular position of the sprayer 14 by rotating the wand holder 26. The sprayer 14 may also be removed from the wand holder 26 and used to achieve more targeted spraying, as may be desired by the user.

The location of the filter cartridge 46 upstream from the handheld sprayer 14 results in all water flowing through the filter cartridge 46. The unique configuration of the housing 12 allows the filter cartridge 46 to be removed and replaced as may be needed with routine maintenance thereof. In this regard, replacement of the filter cartridge 46 does not require disassembly or detachment of any part of the showerhead 10, other than the end cap 50 (for those embodiments including an end cap 50). Accordingly, the showerhead 10 provides the benefit of handheld sprayers, while also incorporating water filtration capabilities into an easy-to-use and compact form factor.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A showerhead having integrated filtration capabilities and configured for use with a handheld sprayer coupled to a hose, the showerhead comprising:

a housing having:
an inlet fluidly connectable to a fluid source; and
an outlet in fluid communication with the inlet and configured to be fluidly connectable to the hose;
a filter cartridge selectively positionable within the housing between the inlet and the outlet, the filter cartridge being configured to remove impurities from liquid passing therethrough; and
a holder pivotally coupled to the housing and configured to detachably engage with the handheld sprayer, the holder being configured to receive a portion of the handheld sprayer along an engagement axis, the engagement axis being constrained to move within a first plane spaced from the housing when the holder pivots relative to the housing, the first plane remaining substantially parallel to a longitudinal axis of the housing throughout the pivotal movement.

2. The showerhead recited in claim 1, wherein the housing defines a longitudinal axis, the holder being pivotal relative to the housing about an axis that is perpendicular to the longitudinal axis.

3. The showerhead recited in claim 1, wherein the holder is pivotable relative to the housing between a first pivot position and a second pivot position.

4. The showerhead recited in claim 3, wherein the holder is configured such that the holder pivots between 35-90 degrees as the holder pivots between the first pivot position and the second pivot position.

5. The showerhead recited in claim 1, wherein the housing includes a main body and a cap configured to be detachably connectable to the main body.

6. The showerhead recited in claim 5, wherein the filter cartridge and main body are configured to facilitate insertion of the filter cartridge into the main body when the cap is detached from the main body.

7. The showerhead recited in claim 6, wherein the cap includes a threaded portion configured to engage with the hose.

8. The showerhead recited in claim 1, wherein the inlet includes an inlet fitting extending around an inlet axis and the outlet includes an outlet fitting extending around an outlet axis, the inlet axis being angularly offset from the outlet axis.

9. The showerhead recited in claim 1, further comprising a locking mechanism operatively coupled to the holder and the housing, the locking mechanism being configured to apply a force on the holder which restricts pivotal movement of the holder relative to the housing.

10. The showerhead recited in claim 1, wherein the holder is associated with a plurality of predefined rotation positions relative to the housing, the holder including a spring-biased locking ball configured to selectively seat within corresponding recesses formed on the housing to retain the holder at the predefined rotation positions and to permit user-adjustable repositioning upon application of a rotational force overcoming the spring bias.

11. The showerhead recited in claim 1, wherein the housing includes an elongate portion sized to receive the filter cartridge through an open end that is closable by a detachable cap, the cap including a threaded connector that defines the outlet and is configured to couple to an end connector of the hose, the end connector cooperating with the cap to axially retain the filter cartridge within the elongate portion.

12. A showerhead configured for use with a filter cartridge, the showerhead comprising:

a housing having:
an inlet fluidly connectable to a fluid source; and
an outlet in fluid communication with the inlet;
the housing being sized to receive the filter cartridge at least partially therein;
a hose fluidly connectable to the outlet;
a handheld sprayer connected to the hose;
a holder pivotally coupled to the housing and configured to detachably engage with the handheld sprayer, the holder being configured to receive a portion of the handheld sprayer along an engagement axis, the engagement axis being constrained to move within a first plane spaced from the housing when the holder pivots relative to the housing, the first plane remaining substantially parallel to the longitudinal axis of the housing throughout the pivotal movement.

13. The showerhead recited in claim 12, wherein the housing defines a longitudinal axis, the holder being pivotal relative to the housing about an axis that is perpendicular to the longitudinal axis.

14. The showerhead recited in claim 12, wherein the holder is pivotable relative to the housing between a first pivot position and a second pivot position.

15. The showerhead recited in claim 14, wherein the holder is configured such that the holder pivots between 35-90 degrees as the holder pivots between the first pivot position and the second pivot position.

16. The showerhead recited in claim 12, wherein the housing includes a main body and a cap configured to be detachably connectable to the main body.

17. The showerhead recited in claim 16, wherein the filter cartridge and main body are configured to facilitate insertion of the filter cartridge into the main body when the cap is detached from the main body.

18. The showerhead recited in claim 17, wherein the cap includes a threaded portion configured to engage with the hose.

19. The showerhead recited in claim 12, wherein the inlet includes an inlet fitting extending around an inlet axis and the outlet includes an outlet fitting extending around an outlet axis, the inlet axis being angularly offset from the outlet axis.

20. The showerhead recited in claim 12, further comprising a locking mechanism operatively coupled to the holder and the housing, the locking mechanism being configured to apply a force on the holder which restricts pivotal movement of the holder relative to the housing.

* * * * *